United States Patent Office 3,775,337
Patented Nov. 27, 1973

3,775,337
FORMATION OF TUBULAR ARTICLES
Christopher Cameron Hope Wheatley, Wantage, and Dennis George, Didcot, England, assignors to United Kingdom Atomic Energy Authority, London, England
No Drawing. Filed July 13, 1970, Ser. No. 54,654
Claims priority, application Great Britain, July 16, 1969, 35,868/69
Int. Cl. G21c *3/02*
U.S. Cl. 252—301.1 R          3 Claims

ABSTRACT OF THE DISCLOSURE

Cladding for nuclear fuel is provided by laying upon a mandrel a sufficient number of layers of a flexible film of cladding material, curing the film to make it self-supporting and then replacing the mandrel with a nuclear fuel artefact to be clad and sintering the cladding so that it shrinks firmly onto the nuclear fuel artefact. The technique may be adapted to use the nuclear fuel artefact as the mandrel.

BACKGROUND OF THE INVENTION

The present invention relates to the formation of tubular articles. More specifically it relates to the formation of tubular articles around a support.

In the case of fast nuclear reactors, it has been proposed that the fuel should be uranium carbide, but the thermal conductivity of this material is so high that the temperature of the body of the fuel is relatively close to that of the coolant unless special expedients are adopted. Unfortunately the temperatures to which the coolant and the fuel can should be subjected are limited by materials considerations and these temperatures are at present well below the optimum temperature for the fuel. One reason why it is desirable to run the fuel very hot is to ensure that it has a measure of plasticity so that swelling and gas formation can be accommodated or released as the case may be. With a fully rigid fuel this is not possible and the burn-up is therefore limited by the inevitable deformation of the fuel. One expedient that may be adopted to give an increased temperature to the fuel is the interposition of an insulating layer between the fuel surface and the inner surface of the can. Obviously this insulating layer should be capable of resisting the high temperatures involved, and moreover it should not be an absorber of neutrons or a moderator. Bearing in mind the difficulty of ensuring uniformity of a gas gap and the fact that use of such a gas gap removes all mutual support as between the fuel and the can, a suitable insulating material appears to be uranium dioxide. However, it will be appreciated that it is not easy to produce a thin coherent layer of uranium dioxide upon uranium carbide, and one use to which this invention may be put is the solving of this problem.

SUMMARY OF THE INVENTION

According to the present invention a cladding is applied to a nuclear fuel artefact by laying upon a mandrel a sufficient number of layers of a flexible film of the cladding material, curing the film to an extent necessary to give a self-supporting artefact, withdrawing the mandrel and replacing it by the nuclear fuel artefact to be clad and then effecting sintering of the cladding, the dimensions of the mandrel relative to the nuclear fuel artefact to be clad being such that the shrinkage on sintering of the cladding is such as to cause the cladding to shrink firmly onto the nuclear fuel artefact.

As will be clear hereinafter, the term "flexible film" is used herein to define a film of cladding material powder together with a sufficiency of binder to enable the film to be formed and, when formed, to be fabricated at least to a limited extent. The cladding material powder may be an oxide or other ceramic such as a carbide or it may alternatively be a metal or alloy, and the sintering technique may be combined with a reaction, as for example to convert a metal to a compound of such metal. More specifically, the oxide or carbide may be formed from a nuclear material such as uranium or non-nuclear materials such as aluminium, zirconium and beryllium. If the cladding material is a metal, it may for example be selected from copper, nickel, iron, zirconium and alloys such as steel, and zircalloy. In the case where the sintering is combined with the reaction, the cladding material may for example in the first place be silicon, which is caused to be converted to silicon nitride by sintering in a nitrogen atmosphere. A plurality of different layers of cladding material may be applied in accordance with this invention, and these cladding layers may be either applied before simultaneous sintering of the layers or by sequentially sintering each layer as it is applied.

It should also be explained that under certain circumstances the artefact to be clad may be used as the mandrel.

In the preferred arrangement the powder of the cladding material is made up with the binder and a solvent into a slurry which is then formed into sheets, for example by a doctor blade technique, on a suitable carrier such as a silicone-coated paper. The solvent is then allowed to evaporate from the sheet, which may then be removed from the carrier as a flexible coherent film. It will be appreciated that the function of the binder is to bond the powder into sheet form after drying has occurred by removal of the solvent, and this binder should be so chosen that the sheet, when formed, is flexible (after warming, if necessary). The binder is therefore desirably a thermoplastic resin and may, for example, be selected from polyvinyl compounds such as the acetate or butyrate or polyacrylates such as polymethacrylate. A plasticiser may also be provided as known in the art or the resin may be internally plasticised.

Any suitable solvent for the binder may be used but for convenience it should be relatively volatile. Methyl ethyl ketone is a suitable solvent.

If it should prove necessary to machine the cladding, this can be effected after sintering, or more conveniently upon the cladding before sintering. In the latter case the green cladding is desirably thoroughly dried out at 100–200° C. If it is then too weak to machine effectively, the original mix should conveniently include a thermosetting resin which will cure at this temperature to produce a rigid cured artefact. An acrylic-epoxy copolymer is a suitable thermosetting resin.

DESCRIPTION OF THE PREFERRED EMBODIMENT

In order that the present invention may more readily be understood an embodiment of the same will now be described by way of example.

This embodiment relates to a fuel element for a fast reactor, the fuel element comprising a rod of uranium carbide actually comprising a plurality of essentially cylindrical pellets, an insulating layer of uranium dioxide and a can of stainless steel.

In order to prepare the uranium dioxide layer, a mix was made up comprising uranium dioxide 1 kg., polyvinyl acetate (internally plasticised binder) 45 g., methyl ethyl ketone (solvent) 30 ml. This slurry was then loaded into a trough having its base closed by a silicone-coated paper carrier strip. The carrier was pulled under the bottom of the trough and under a doctor blade to deposit a layer of the mix on the carrier, and this layer was dried by the evaporation of the solvent to give a sheet 0.3 mm. thick. After drying, the sheet was removed from the carrier.

A former was then taken which was 6.5 mm. in diameter and three layers of the uranium dioxide sheet were applied to the former, the layers being moistened with a little solvent in order to ensure adherence between the various layers. The assembly of former and layers of uranium dioxide was thoroughly dried out at about 100° C., and then subjected to isostatic pressing to improve adherence between the layers.

The former was then removed to provide a tube of uranium dioxide film and this was loaded with 6 mm. diameter uranium carbide fuel pellets. Uranium dioxide fuel pellets were located at each end of the assembly, which was then sintered in a pure argon atmosphere at 1550° C.

The diameter of the green uranium dioxide tube was such that on densifying it shrank on to the uranium carbide fuel pellets, giving a firmly adherent coating. The adherence was such that there was no difficulty in performing a centreless grinding operating to remove a small amount of the outer layer of uranium dioxide in order to give a precise outside diameter.

The fuel rod made as above described was then inserted in a fuel can made by the techniques disclosed herein or by any other suitable technique.

Although the present invention has been described with reference to a generally cylindrical article, it is in no way limited to the shape of the article, bearing in mind the fact that shrinkage takes place on sintering.

What is claimed is:

1. A method of coating a body of ceramic nuclear fuel material with uranium dioxide, said method comprising the steps of laying upon a mandrel at least one layer of a flexible film comprising uranium dioxide mixed with a binder, heating the film to form a self-supporting body essentially of uranium dioxide conforming to the shape of said mandrel withdrawing the mandrel from the body and replacing the mandrel with said ceramic nuclear fuel material, and then sintering the uranium dioxide body, the dimensions of the mandrel relative to the nuclear fuel material to be coated being such that upon sintering of the self-supporting body it shrinks firmly on to the nuclear fuel material.

2. A method of coating a body of ceramic nuclear fuel material with uranium dioxide, said method comprising the steps of laying around the nuclear fuel material at least one layer of a flexible film comprising uranium dioxide mixed with a binder and sintering the uranium dioxide.

3. A body of uranium carbide coated with a coherent layer of sintered uranium dioxide.

References Cited
UNITED STATES PATENTS

| | | | |
|---|---|---|---|
| 2,992,172 | 7/1961 | Blainey et al. | 75—208 |
| 3,197,847 | 8/1965 | Kerstetter | 75—208 |
| 3,124,875 | 3/1964 | Takahashi et al. | 264—0.5 |
| 3,081,249 | 3/1963 | Whittemore, Jr. | 264—0.5 |
| 3,255,278 | 6/1966 | Smith | 264—0.5 |
| 3,262,858 | 7/1966 | Gittus | 29—182.3 |
| 3,454,396 | 7/1969 | Johnson et al. | 75—208 |

FOREIGN PATENTS 1,306,206   9/1962   France.

CARL D. QUARFORTH, Primary Examiner

B. HUNT, Assistant Examiner

U.S. Cl. X.R.

117—46 CA, 169 R; 176—82, 91 SP; 264—0.5